United States Patent
Takayama

(10) Patent No.: US 9,145,331 B2
(45) Date of Patent: *Sep. 29, 2015

(54) CRYSTALLIZABLE GLASS COMPOSITION

(71) Applicant: NIPPON ELECTRIC GLASS CO., LTD., Otsu-shi, Shiga (JP)

(72) Inventor: Yoshihisa Takayama, Otsu (JP)

(73) Assignee: Nippon Electric Glass Co., Ltd., Shiga (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/379,015

(22) PCT Filed: Apr. 9, 2013

(86) PCT No.: PCT/JP2013/060723
§ 371 (c)(1),
(2) Date: Aug. 15, 2014

(87) PCT Pub. No.: WO2013/161560
PCT Pub. Date: Oct. 31, 2013

(65) Prior Publication Data
US 2015/0031524 A1    Jan. 29, 2015

(30) Foreign Application Priority Data

Apr. 24, 2012 (JP) ................................. 2012-098352
Jan. 9, 2013 (JP) ................................. 2013-001492

(51) Int. Cl.
C03C 8/04 (2006.01)
C03C 8/24 (2006.01)

(52) U.S. Cl.
CPC ... C03C 8/04 (2013.01); C03C 8/24 (2013.01); C03C 2209/00 (2013.01); Y02E 60/521 (2013.01); Y02E 60/525 (2013.01)

(58) Field of Classification Search
CPC .............. C03C 8/02; C03C 8/04; C03C 8/24; H01M 8/0282
See application file for complete search history.

(56) References Cited

U.S. PATENT DOCUMENTS

| | | | | |
|---|---|---|---|---|
| 5,210,057 | A * | 5/1993 | Haun et al. ........................ | 501/69 |
| 7,521,387 | B2 * | 4/2009 | Xue et al. ........................ | 501/15 |
| 8,178,453 | B2 * | 5/2012 | Tanida et al. ..................... | 501/73 |
| 2003/0224923 | A1 | 12/2003 | Cho et al. | |
| 2006/0019813 | A1 | 1/2006 | Yoshii | |
| 2010/0129726 | A1 | 5/2010 | Tanida et al. | |

FOREIGN PATENT DOCUMENTS

| | | |
|---|---|---|
| EP | 0 498 409 A1 | 8/1992 |
| EP | 498410 * | 8/1992 |

(Continued)

OTHER PUBLICATIONS

Official Communication issued in International Patent Application No. PCT/JP2013/060723, mailed on Jul. 9, 2013.

*Primary Examiner* — Karl Group
(74) *Attorney, Agent, or Firm* — Keating & Bennett, LLP

(57) ABSTRACT

A crystallizable glass composition containing, in % by mole in glass component composition, 40 to 70% $SiO_2$, 5 to 35% MgO, 5 to 35% BaO, 5 to 35% ZnO, 0 to 20% CaO, 0 to 20% SrO, 0 to 5% $B_2O_3$, 0 to 2% $Al_2O_3$, and 0 to 30% $La_2O_3+Y_2O_3+Gd_2O_3+Nb_2O_5+Ta_2O_5$. Provided is a crystallizable glass composition which has fluidity suitable for bonding, has a high coefficient of thermal expansion after undergoing thermal treatment, is less likely to degrade the power generation property of the fuel cell owing to evaporation of glass components even when exposed to high temperatures for a long period, and has excellent thermal resistance after bonding.

6 Claims, 1 Drawing Sheet

(56) References Cited

FOREIGN PATENT DOCUMENTS

| JP | 05-097471 A | 4/1993 |
| JP | 05-097472 A | 4/1993 |
| JP | 2002-362937 A | 12/2002 |
| JP | 2004-043297 A | 2/2004 |
| JP | 2006-056769 A | 3/2006 |
| WO | 2009/017173 A1 | 2/2009 |

* cited by examiner

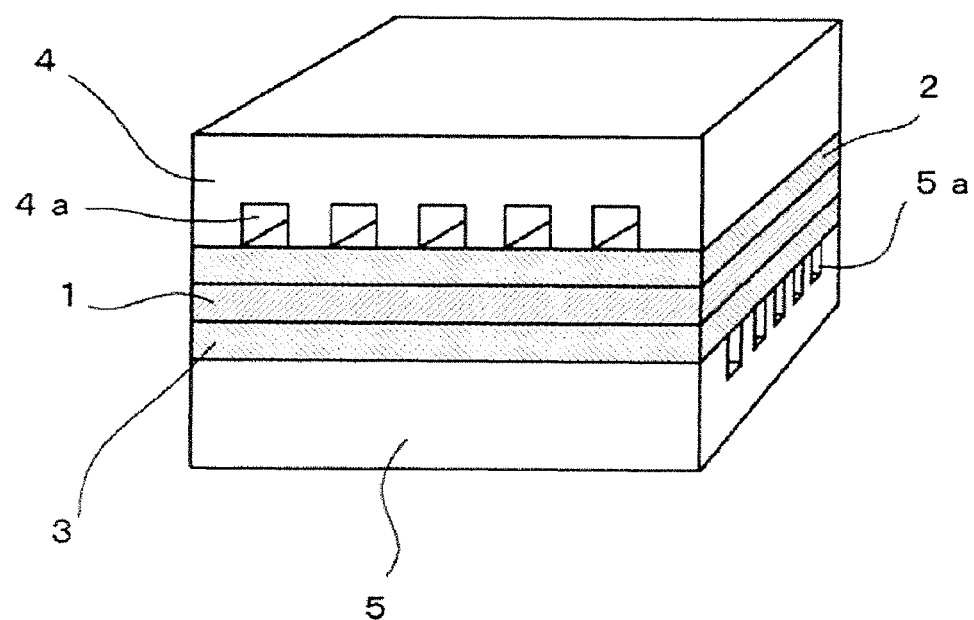

CRYSTALLIZABLE GLASS COMPOSITION

TECHNICAL FIELD

The present invention relates to crystallizable glass compositions. More particularly, the present invention relates to a crystallizable glass composition suitable for bonding metals, such as SUS or Fe, or high-expansion ceramics, such as ferrite or zirconia.

BACKGROUND ART

Fuel cells have recently received attention as an important technique which can achieve high energy efficiency and significantly reduce emission of $CO_2$. The type of fuel cell varies with the electrolyte used. Fuel cells for industrial application fall into four types: a phosphoric-acid fuel cell (PAFC), a molten carbonate fuel cell (MCFC), a solid oxide fuel cell (SOFC), and a polymer electrolyte fuel cell (PEFC). Among them, the SOFC is characterized in that it exhibits small internal resistance and therefore the highest power generation efficiency in the fuel cells, as well as that because there is no need to use any precious metal as a catalyst, its production costs can be kept down. For these reasons, the SOFC is a system widely applicable from small-scale applications, such as those for domestic use, to large-scale applications, such as a power plant, and expectations have been raised for its potential.

The FIG. shows the structure of a general planar SOFC. A general planar SOFC includes a cell in which an electrolyte 1 made of ceramic material, such as yttria-stabilized zirconia (YSZ), an anode 2 made such as of Ni/YSZ, and a cathode 3 made such as of $(La,Ca)CrO_3$ are layered and integrated. The planar SOFC further includes: a first support substrate 4 adjoining the anode 2 and having passages of fuel gas (fuel channels 4a) formed therein; and a second support substrate 5 adjoining the cathode 3 and having passage of air (air channels 5a) formed therein, wherein the first and second support substrates 4, 5 are fixed to the top and bottom, respectively, of the cell. The first support substrate 4 and the second support substrate 5 are fixed to the cell so that their gas passages are perpendicular to each other. The first support substrate 4 and the second support substrate 5 are made of metal, such as SUS.

In the planar SOFC having the above structure, a fuel gas, such as hydrogen ($H_2$), town gas, natural gas, biogas or liquid fuel, is allowed to flow through the fuel channels 4a and concurrently air or oxygen ($O_2$) is allowed to flow through the air channels 5a. During this time, the cathode develops a reaction of $1/2O_2+2e^-\rightarrow O^{2-}$, while the anode develops a reaction of $H_2+O^{2-}\rightarrow H_2O+2e^-$. These reactions cause direct conversion of chemical energy to electric energy, so that the planar SOFC can generate electric power. To provide high power, in an actual planar SOFC, a plurality of cell structure units shown in the FIG. are layered.

In producing the planar SOFC having the above structure, hermetic sealing is necessary between its members (particularly, each support substrate and the cell) to prevent the occurrence of gas leakage. For this purpose, there has been proposed a method for hermetically sealing the members by interlaying a sheet-shaped gasket made of inorganic material, such as mica, vermiculite or alumina, between the members. However, this method does not involve bonding the members together, which may cause a tiny amount of gas leakage and thus result in poor fuel use efficiency. Therefore, consideration has been given to a method for bonding the members with an adhesive material made of glass.

To bond high-expansion members made of metal or ceramics, it is necessary to conform the coefficient of thermal expansion of the adhesive material to those of the members. In addition, to achieve good bondability, the adhesive material is required to have sufficient fluidity at the bonding temperature. Furthermore, the temperature range of the SOFC in which it develops an electrochemical reaction (i.e., the operating temperature range) is as high as about 600 to about 800° C. and the SOFC is operated at these temperatures over a long period. Therefore, the adhesive material is required to have high thermal resistance to avoid, even when exposed to high temperatures for a long period, deterioration in hermeticity and bondability due to melting of bonded portions and degradation in power generation property of the fuel cell due to evaporation of glass components.

To achieve the above required properties, glass compositions capable of precipitating high-expansion crystals through thermal treatment are proposed in Patent Literatures 1 and 2. Specifically, Patent Literature 1 describes a crystallizable glass composition which can precipitate CaO—MgO—$SiO_2$-based crystals through thermal treatment. Patent Literature 2 describes a crystallizable glass composition which can precipitate MgO-based crystals when undergoing thermal treatment. Furthermore, Patent Literature 3 describes an adhesive material made of a $SiO_2$—$B_2O_3$—SrO-based amorphous glass composition precipitating no crystals through thermal treatment.

CITATION LIST

Patent Literature

Patent Literature 1: WO 2009/017173
Patent Literature 2: JP-A-2004-43297
Patent Literature 3: JP-A-2006-56769

SUMMARY OF INVENTION

Technical Problem

The crystallizable glass composition described in Patent Literature 1 has high viscosity at high temperatures and is therefore less likely to soften and fluidize during thermal treatment, which makes it difficult to provide a dense sintered body. As a result, there arises a problem of difficulty in achieving stable sealing property. The crystallizable glass composition described in Patent Literature 2, upon exposure to high temperatures for a long period, is likely to evaporate its glass components and therefore may adversely affect the power generation property of the fuel cell. The amorphous glass composition described in Patent Literature 3 has a glass transition point near 600° C. and therefore has a problem in that under a high-temperature operating environment at about 600 to about 800° C. the bonded portions will melt, thus failing to ensure hermeticity and bondability.

In view of the foregoing problems, the present invention provides a crystallizable glass composition which has fluidity suitable for bonding, has a high coefficient of thermal expansion after undergoing thermal treatment, is less likely to degrade the power generation property of the fuel cell owing to evaporation of glass components even when exposed to high temperatures for a long period, and has excellent thermal resistance after bonding.

Solution to Problem

The present invention relates to a crystallizable glass composition containing, in % by mole in glass component composition, 40 to 70% $SiO_2$, 5 to 35% MgO, 5 to 35% BaO, 5 to 35% ZnO, 0 to 20% CaO, 0 to 20% SrO, 0 to 5% $B_2O_3$, 0 to 2% $Al_2O_3$, and 0 to 30% $La_2O_3+Y_2O_3+Gd_2O_3+Nb_2O_5+Ta_2O_5$.

The crystallizable glass composition of the present invention contains MgO, BaO, and ZnO as essential components and, through thermal treatment during boding of members, precipitates highly thermally resistant crystals containing these components. Therefore, the bonded portion is less likely to fluidize or melt even when exposed to high temperatures for a long period, so that the deterioration thereof in hermeticity and bondability can be reduced.

In addition, the crystallizable glass composition of the present invention is characterized by containing $B_2O_3$ as less as possible and therefore being less likely to evaporate $B_2O_3$ during use at high temperatures.

The term "crystallizable glass composition" in the present invention means a glass composition precipitating crystals when undergoing thermal treatment. Furthermore, the term "undergo thermal treatment" means to undergo thermal treatment under conditions of a temperature of 800° C. or above for 10 minutes or more.

Secondly, the crystallizable glass composition of the present invention preferably contains 0 to 15% $La_2O_3$ and 0 to 15% $Y_2O_3$.

Thirdly, the crystallizable glass composition of the present invention is preferably substantially free of $R_2O$ (where R represents an alkali metal) and $P_2O_5$.

$R_2O$ and $P_2O_5$ are likely to deteriorate the electrical insulation of a bonding layer and likely to evaporate during use at high temperatures. Therefore, by the composition substantially free of these components, the occurrence of the above problems can be reduced as much as possible.

Fourthly, the crystallizable glass composition of the present invention preferably precipitates crystals of one or more selected from the group consisting of $2MgO.SiO_2$, $BaO.2MgO.2SiO_2$, and $2SiO_2.2ZnO.BaO$ when undergoing thermal treatment.

By precipitating these crystals after thermal treatment, a composition can be obtained which is highly expansive and excellent in thermal resistance.

Fifthly, the crystallizable glass composition of the present invention preferably has, after undergoing thermal treatment, a coefficient of thermal expansion of $90\times10^{-7}/°$ C. or more in a temperature range from 30 to 700° C.

Sixthly, the present invention relates to an adhesive material containing any one of the above crystallizable glass compositions.

Advantageous Effects of Invention

The present invention can provide a crystallizable glass composition which has fluidity suitable for bonding, has a high coefficient of thermal expansion after undergoing thermal treatment, is less likely to degrade the power generation property of the fuel cell owing to evaporation of glass components even when exposed to high temperatures for a long period, and has excellent thermal resistance after bonding.

BRIEF DESCRIPTION OF DRAWINGS

The FIG. is a schematic perspective view showing the basic structure of an SOFC.

DESCRIPTION OF EMBODIMENTS

The reasons why the glass compositional ratio of the crystallizable glass composition of the present invention is defined as described above will be described below. Note that "%" used in the following description of each component means "% by mole" unless otherwise stated.

$SiO_2$ is a component for precipitating high-expansion crystals through thermal treatment and has the effect of expanding the vitrification range to facilitate vitrification and the effect of improving water resistance and thermal resistance. The $SiO_2$ content is 40 to 70%, preferably 41 to 69%, and more preferably 41 to 65%. If the $SiO_2$ content is too small, the vitrification range becomes too narrow, so that vitrification will be difficult to achieve. On the other hand, if the $SiO_2$ content is too large, crystals will be difficult to precipitate even when the glass composition undergoes the thermal treatment. In addition, the melting temperature tends to rise to make it difficult to melt the glass composition.

MgO, BaO, and ZnO are components of high-expansion crystals to be precipitated from the glass composition by undergoing the thermal treatment. The content of each of these components is 5 to 35%, preferably 5 to 34%, and more preferably 6 to 33%. If the content of each of these components is too small, crystallization cannot sufficiently be promoted even when the glass composition undergoes the thermal treatment, so that the resultant material is less likely to provide high-expansion property and tends to have poor thermal resistance after the thermal treatment. On the other hand, if the content of each of these components is too large, the vitrification range narrows to easily devitrify the glass composition and the fluidity tends to deteriorate.

CaO and SrO are components for expanding the vitrification range to facilitate vitrification. The content of each of these components is 0 to 20%, preferably 0 to 18%, and more preferably 0.1 to 16%. If the content of each of these components is too large, high-expansion crystals will be difficult to precipitate and the fluidity tends to deteriorate.

$B_2O_3$ is a component for improving the fluidity. The $B_2O_3$ content is 0 to 5%, preferably 0 to 4%, and more preferably 0 to 3%. If the $B_2O_3$ content is too large, water resistance and thermal resistance will deteriorate and $B_2O_3$ will be likely to evaporate during use at high temperatures to degrade the power generation property of the fuel cell.

$Al_2O_3$ is a component for controlling the viscosity. The $Al_2O_3$ content is 0 to 2%, preferably 0 to 1.5%, and more preferably 0 to 1%. If the $Al_2O_3$ content is too large, low-expansion crystals of $2SiO_2.Al_2O_3.BaO$ will preferentially precipitate and high-expansion crystals will be difficult to precipitate.

$La_2O_3$, $Y_2O_3$, $Gd_2O_3$, $Nb_2O_5$, and $Ta_2O_5$ are components for improving the fluidity. The total amount of these components is 0 to 30%, preferably 0 to 15%, more preferably 0 to 14%, still more preferably 0.1 to 13%, and particularly preferably 1 to 12%. If the content of these components is too large, the glass composition will be likely to devitrify during melting or thermal treatment, so that fluidity suitable for bonding will be difficult to achieve.

$La_2O_3$ is very effective in improving the fluidity. Therefore, by positively containing $La_2O_3$, a crystallizable glass composition exhibiting high fluidity can be easily obtained. In addition, $La_2O_3$ is a component for expanding the vitrification range to facilitate vitrification. The $La_2O_3$ content is preferably 0 to 15%, more preferably 0 to 14%, and still more preferably 0.1 to 13%. If the $La_2O_3$ content is too large, the glass composition will be likely to devitrify during melting or thermal treatment, so that fluidity suitable for bonding will be difficult to achieve.

$Y_2O_3$ is a component having the effect of improving the fluidity as much as $La_2O_3$ and a component for expanding the vitrification range to facilitate vitrification. The $Y_2O_3$ content is preferably 0 to 15%, more preferably 0 to 14%, and still more preferably 0 to 13%. If the $Y_2O_3$ content is too large, the glass composition will be likely to devitrify during melting or thermal treatment, so that fluidity suitable for bonding will be difficult to achieve.

$Gd_2O_3$ is a component having the effect of improving the fluidity as much as $La_2O_3$ and a component for expanding the vitrification range to facilitate vitrification. The $Gd_2O_3$ content is preferably 0 to 15%, more preferably 0 to 14%, and still more preferably 0 to 13%. If the $Gd_2O_3$ content is too large, the glass composition will be likely to devitrify during melting or thermal treatment, so that fluidity suitable for bonding will be difficult to achieve.

$Nb_2O_5$ is a component for improving the fluidity and a component for promoting crystal precipitation during thermal treatment to improve the thermal resistance. The $Nb_2O_5$ content is preferably 0 to 10%, more preferably 0 to 9%, and still more preferably 0 to 8%. If the $Nb_2O_5$ content is too large, the glass composition will be likely to devitrify during melting or thermal treatment, so that fluidity suitable for bonding will be difficult to achieve.

$Ta_2O_5$ is a component for improving the fluidity. In addition, the inclusion of $Ta_2O_5$ enables appropriate control of the crystallization temperature. Specifically, if the glass composition contains $Ta_2O_5$, its crystallization temperature shifts to higher values, which is effective where high-temperature firing is required. The $Ta_2O_5$ content is preferably 0 to 10%, more preferably 0 to 9%, and still more preferably 0 to 8%. If the $Ta_2O_5$ content is too large, the glass composition will be likely to devitrify during melting or thermal treatment, so that fluidity suitable for bonding will be difficult to achieve.

The crystallizable glass composition of the present invention may contain, besides the aforementioned components, $TiO_2$, $ZrO_2$, $SnO_2$, $WO_3$ or other components, each with a content of up to 2%. However, the crystallizable glass composition is preferably substantially free of $R_2O$ (where R represents an alkali metal) and $P_2O_5$ which are likely to deteriorate the electrical insulation of a bonding layer and likely to evaporate during use at high temperatures. Note that "substantially free of" herein means that no amount of these components are deliberately contained as glass components and does not mean to exclude even inclusion of them as unavoidable impurities. Specifically, this means that the content of each of these components is below 0.1%.

The crystallizable glass composition of the present invention preferably precipitates crystals of one or more selected from the group consisting of $2MgO \cdot SiO_2$, $BaO \cdot 2MgO \cdot 2SiO_2$, and $2SiO_2 \cdot 2ZnO \cdot BaO$ when undergoing thermal treatment. By precipitating these crystals, a composition can be obtained which has high expansibility and excellent thermal resistance after undergoing thermal treatment. Specifically, the crystallizable glass composition of the present invention preferably has, after undergoing the thermal treatment, a coefficient of thermal expansion of $90 \times 10^{-7}/°$ C. or more in a temperature range from 30 to 700° C.

Next, a description will be given of a method for producing the crystallizable glass composition of the present invention and an adhesive material containing the crystallizable glass composition of the present invention.

First, a raw material prepared to have the glass component composition as previously described is melted at about 1400 to about 1600° C. for about 0.5 to about 2 hours. The resultant molten glass is formed such as in a film, ground, and classified to produce glass powder made of the glass composition of the present invention. The glass powder preferably has a particle size (d50) of about 2 to about 20 μm.

Various types of filler powders are added to the glass powder, if necessary (for example, for the purpose of controlling (reducing) the fluidity). Examples of the filler powders include magnesia (MgO), zinc oxide (ZnO), zirconia ($ZrO_2$), titania ($TiO_2$), and alumina ($Al_2O_3$). The amount of the filler powder added is preferably 0 to 10 parts by mass and more preferably 0.1 to 8 parts by mass relative to 100 parts by mass of glass powder. If the amount of the filler powder added is too large, the fluidity excessively deteriorates, which may interfere with bonding work. The particle size (d50) of the filler powder is preferably about 0.2 to about 20 μm.

An organic solvent, a resin, a plasticizer, a dispersant, and so on are added to the glass powder made of the glass composition of the present invention (or a powder mixture of the glass powder and the filler powder) to prepare a glass paste.

The organic solvent is a component for impasting the glass powder and, for example, terpineol (Ter), diethylene glycol monobutyl ether (BC), diethylene glycol monobutyl ether acetate (BCA), 2,2,4-trimethyl-1,3-pentanediol monoisobutyrate or dihydroterpineol can be used alone or by a mixture of them. The content of the organic solvent in the glass paste is preferably about 10 to about 40% by mass.

The resin is a component for increasing the strength of a film after being dried and for giving flexibility and the content thereof is generally about 0.1 to about 20% by mass in the glass paste. Examples of the resin that can be used include thermoplastic resins, specifically, polybutyl methacrylate, polyvinyl butyral, polymethyl methacrylate, polyethyl methacrylate, and ethyl cellulose and these compounds can be used alone or by a mixture of them.

The plasticizer is a component for controlling the drying speed and giving flexibility to the dried film and the content thereof is generally about 0 to about 10% by mass in the glass paste. The plasticizers that can be used include butyl benzyl phthalate, dioctyl phthalate, diisooctyl phthalate, dicapryl phthalate, and dibutyl phthalate and these compounds can be used alone or by a mixture of them.

The dispersant that can be used include ionic dispersants and non-ionic dispersants. The ionic dispersants that can be used include carboxylic acid-based dispersants, polycarboxylic acid-based dispersants, such as dicarboxylic acid-based dispersants, and amine dispersants; and the non-ionic dispersants that can be used include polyester condensate dispersants and polyol ether dispersants. The content of the dispersant is generally about 0 to about 5% by mass in the glass paste.

The resultant glass paste is applied to a portion to be bonded of a first member made such as of metal or ceramics and dried. Furthermore, a second member likewise made such as of metal or ceramics is immobilized in contact with the dried glass paste film and then undergoes thermal treatment at about 800 to about 950° C. Through this thermal treatment, the glass powder first softens and fluidizes to bond the first member and the second member together and then precipitates high-expansion crystals. Therefore, the bonded portion has excellent thermal resistance and is less likely to fluidize and melt when exposed to high temperatures for a long period.

Although the description thus far is of the method for using the glass composition of the present invention as an adhesive material in the form of a glass paste, the glass composition can also be used in forms other than a glass paste, such as a powder, a green sheet or a tablet.

EXAMPLES

A description will be given below of the crystallizable glass composition of the present invention with reference to examples but the present invention is not limited to the examples.

Tables 1 to 3 show examples of the present invention (Samples Nos. 1 to 9 and 13 to 15) and comparative examples (Samples Nos. 10 to 12).

TABLE 1

|  | No. 1 | No. 2 | No. 3 | No. 4 | No. 5 | No. 6 |
|---|---|---|---|---|---|---|
| Glass Composition (% by mole) | | | | | | |
| $SiO_2$ | 50 | 50 | 50 | 50 | 65 | 41 |
| MgO | 13 | 13 | 13 | 13 | 6 | 33 |
| BaO | 10 | 10 | 10 | 10 | 6 | 6 |
| ZnO | 22 | 22 | 20 | 15 | 19 | 6 |
| CaO | — | — | 2 | 10 | — | 1 |
| SrO | — | — | — | — | — | — |
| $B_2O_3$ | — | — | — | — | 3 | — |
| $Al_2O_3$ | — | — | — | — | 1 | — |
| $La_2O_3$ | 5 | — | 5 | — | — | 13 |
| $Y_2O_3$ | — | 5 | — | 2 | — | — |
| Devitrified Matter | Not Found | Not Found | Not Found | Not Found | Not Found | Not Found |
| Coefficient of Thermal Expansion ($\times 10^{-7}$/° C.) | 143 | 129 | 136 | 109 | 95 | 132 |
| Glass Transition Point (° C.) | 698 | 726 | 705 | 692 | 750 | 683 |
| Softening Point (° C.) | 840 | 871 | 843 | 847 | 882 | 803 |
| Precipitated Crystal | A, B, C | A, B, C | A, B, C | A, B, C | A, C | A, B |
| Crystallization Temperature (° C.) | 905 | 943 | 911 | 926 | 940 | 890 |
| Crystalline Melting Point (° C.) | >1000 | >1000 | >1000 | >1000 | >1000 | >1000 |
| Fluidity | ◎ | ◎ | ◎ | ◎ | ◎ | ○ |
| Evaporation of Boron Component | Not Found | Not Found | Not Found | Not Found | Not Found | Not Found |

TABLE 2

|  | No. 7 | No. 8 | No. 9 | No. 10 | No. 11 | No. 12 |
|---|---|---|---|---|---|---|
| Glass Composition (% by mole) | | | | | | |
| $SiO_2$ | 45 | 41 | 45 | 42 | 45 | 50 |
| MgO | 10 | 6 | 10 | 9 | 20 | 12 |
| BaO | 10 | 33 | 10 | 40 | 3 | 15 |
| ZnO | 33 | 7 | 10 | 9 | 10 | 15 |
| CaO | — | — | 2 | — | 7 | — |
| SrO | — | — | 16 | — | 7 | — |
| $B_2O_3$ | 2 | — | 2 | — | 2 | 8 |
| $Al_2O_3$ | — | — | 1 | — | 1 | — |
| $La_2O_3$ | — | — | 2 | — | — | — |
| $Y_2O_3$ | — | 13 | 2 | — | 5 | — |
| Devitrified Matter | Not Found | Not Found | Not Found | Found | Not Found | Not Found |
| Coefficient of Thermal Expansion ($\times 10^{-7}$/° C.) | 114 | 110 | 105 | — | 87 | 115 |
| Glass Transition Point (° C.) | 695 | 735 | 687 | 678 | 681 | 675 |
| Softening Point (° C.) | 814 | 870 | 806 | 810 | 860 | 801 |
| Precipitated Crystal | A, B, C | A, B | A, B, C | — | Not precipitated | A, B, C |
| Crystallization Temperature (° C.) | 880 | 940 | 893 | 823 | — | 899 |
| Crystalline Melting Point (° C.) | >1000 | >1000 | >1000 | >1000 | — | >1000 |
| Fluidity | ○ | ○ | ◎ | X | ◎ | ◎ |
| Evaporation of Boron Component | Not Found | Not Found | Not Found | Not Found | Not Found | Found |

TABLE 3

|  | No. 13 | No. 14 | No. 15 |
|---|---|---|---|
| Glass Composition (% by mole) | | | |
| $SiO_2$ | 50 | 52 | 48 |
| MgO | 15 | 15 | 13 |
| BaO | 10 | 15 | 13 |
| ZnO | 15 | 15 | 20 |
| CaO | 5 | — | 3 |
| SrO | — | — | — |
| $B_2O_3$ | — | — | — |
| $Al_2O_3$ | — | — | — |
| $La_2O_3$ | — | — | — |
| $Y_2O_3$ | — | — | — |
| $Gd_2O_3$ | 5 | — | — |
| $Nb_2O_5$ | — | 3 | — |
| $Ta_2O_5$ | — | — | 3 |
| Devitrified Matter | Not Found | Not Found | Not Found |
| Coefficient of Thermal Expansion ($\times 10^{-7}$/° C.) | 120 | 110 | 97 |
| Glass Transition Point (° C.) | 678 | 683 | 712 |
| Softening Point (° C.) | 810 | 820 | 874 |
| Precipitated Crystal | A, B, C | A, B, C | A, B, C |
| Crystallization Temperature (° C.) | 923 | 915 | 980 |
| Crystalline Melting Point (° C.) | >1000 | >1000 | >1000 |
| Fluidity | ◎ | ○ | ◎ |
| Evaporation of Boron Component | Not Found | Not Found | Not Found |

Each sample in the tables was produced in the following manner.

Each of raw materials prepared to have the component compositions shown in the above tables was melted at 1400 to 1600° C. for approximately an hour and the resultant melt was allowed to flow between a pair of rollers to form it in a film. The film-shaped formed body thus obtained was ground with a ball mill and classified to obtain a sample (crystallizable glass composition powder) having a particle size (d50) of approximately 10 μm.

Each sample was measured or evaluated for the coefficient of thermal expansion, the glass transition point, the softening point, the fluidity, the precipitated crystal, the crystallization temperature, the crystalline melting point, and whether or not the sample evaporated any boron component. The results are shown in Tables 1 to 3.

As is evident from the tables, upon the forming, no devitrified matter was found in Samples Nos. 1 to 9 and 13 to 15, which are examples of the present invention. Furthermore, these samples precipitated high-expansion crystals and exhibited coefficients of thermal expansion as high as $95 \times 10^{-7}/°$ C. to $143 \times 10^{-7}/°$ C. In addition, it can be seen that these samples were not found to evaporate any boron component through the thermal treatment and exhibited excellent thermal resistance.

On the other hand, Sample No. 10, which is one of the comparative examples, devitrified upon the forming and therefore exhibited poor fluidity during firing. Sample No. 11 precipitated no high-expansion crystals through the thermal treatment and therefore exhibited a coefficient of thermal expansion as low as $87 \times 10^{-7}/°$ C. Sample No. 12 was found to evaporate the boron component through the thermal treatment.

The measurement and evaluation for the above properties were conducted in the following manners.

Whether or not the samples produced devitrified matter upon the forming was evaluated by observing the film-shaped formed bodies with a microscope (×50), wherein the samples found to produce no devitrified matter were indicated by "Not Found" and the samples found to produce devitrified matter were indicated by "Found".

For the coefficient of thermal expansion, each glass powder sample was pressed into a shape and the pressed sample was subjected to thermal treatment at 900° C. for 15 minutes and then ground into the shape of a column of 4 mm diameter and 20 mm length. Using the measurement sample thus obtained, the value of coefficient of thermal expansion within a temperature range of 30 to 700° C. was found in accordance with JIS R3102.

The glass transition point, the softening point, the crystallization temperature, and the crystalline melting point were measured with a macro differential thermal analyzer. Specifically, in a chart obtained by measuring each glass powder sample up to 1050° C. with the macro differential thermal analyzer, the value of the first inflection point was considered as the glass transition point, the value of the fourth inflection point was considered as the softening point, the value of a strong exothermic peak was considered as the crystallization temperature, and the value of an endothermic peak obtained after crystallization was considered as the crystalline melting point. Note that as the crystalline melting point is higher or when no crystalline melting point is found, this means the crystals stably existing even at high temperatures and can provide the determination that the sample has high thermal resistance.

The fluidity was evaluated in the following manner. The same amount of each glass powder sample as the specific gravity was loaded into a molding die of 20 mm diameter and pressed into a shape and the resultant formed body was held at 850 to 1000° C. for 15 minutes on a SUS430 plate. The formed bodies after the firing were evaluated by considering those having a flow button diameter of 18 mm or more as very good "⊚", considering those having a flow button diameter of from 16 mm to below 18 mm as good "○", and considering those having a flow button diameter of below 16 mm as poor "x".

The precipitated crystals were identified by subjecting the glass powder sample to an XRD measurement and comparing the measurement results with the JCPDS card. As the types of precipitated crystals identified in the above manner, $2MgO.2SiO_2$, $BaO.2MgO.2SiO_2$, and $2SiO_2.2ZnO.BaO$ are indicated by "A", "B", and "C", respectively, in the above tables.

Whether or not the sample evaporated any boron component was evaluated in the following manner. The same amount of each glass powder sample as the specific gravity was loaded into an alumina tube of 20 mm diameter and an alumina plate was placed on top of the opening of the alumina tube. The alumina plate and tube were held at 850 to 1000° C. for two hours to allow evaporant from the glass powder sample to be deposited on the alumina plate. The evaporant deposited on the alumina plate was dissolved in an acid solution and evaluated by subjecting the solution to ICP optical emission spectrometry, wherein the samples from the evaporants of which no boron was detected were indicated by "Not Found" and the samples from the evaporants of which boron was detected were indicated by "Found".

Industrial Applicability

The crystallizable glass composition of the present invention is suitable as an adhesive material for metals, such as SUS and Fe, and high-expansion ceramics, such as ferrite and zirconia. In particular, the crystallizable glass composition is suitable as an adhesive material for hermetically sealing a support substrate, an electrode member, and other members which are used in producing an SOFC. Furthermore, the crystallizable glass composition of the present invention can be used not only for bonding application but also for other purposes, such as coating and filling. Specifically, the crystallizable glass composition of the present invention can be used for a thermistor, a hybrid IC, and like applications.

REFERENCE SIGNS LIST

1 . . . electrolyte
2 . . . anode
3 . . . cathode
4 . . . first support substrate
4a . . . fuel channel
5 . . . second support substrate
5a . . . air channel

The invention claimed is:

1. A crystallizable glass composition containing, in % by mole in glass component composition, 40 to 70% $SiO_2$, 5 to 35% $MgO$, 5 to 35% $BaO$, 5 to 35% $ZnO$, 0 to 20% $CaO$, 0 to 20% $SrO$, 0 to 5% $B_2O_3$, 0 to 2% $Al_2O_3$, and 0.1 to 30% $La_2O_3+Y_2O_3+Gd_2O_3+Nb_2O_5+Ta_2O_5$.

2. The crystallizable glass composition according to claim 1, containing 0 to 15% $La_2O_3$ and 0 to 15% $Y_2O_3$.

3. The crystallizable glass composition according to claim 1, being substantially free of $R_2O$ (where R represents an alkali metal) and $P_2O_5$.

4. The crystallizable glass composition according to claim 1, wherein the crystallizable glass composition precipitates crystals of one or more selected from the group consisting of $2MgO.SiO_2$, $BaO.2MgO.2SiO_2$, and $2SiO_2.2ZnO.BaO$ when undergoing thermal treatment.

5. The crystallizable glass composition according to claim 1, having, after undergoing thermal treatment, a coefficient of thermal expansion of $90 \times 10^{-7}/°$ C. or more in a temperature range from 30 to 700° C.

6. An adhesive material containing the crystallizable glass composition according to claim 1.

* * * * *